June 13, 1950 A. COMPARE 2,511,567

RECORD CHANGER

Filed Dec. 27, 1946

INVENTOR.
ALDO COMPARE
BY David J. Mscot
ATTORNEY

Patented June 13, 1950

2,511,567

UNITED STATES PATENT OFFICE 2,511,567

RECORD CHANGER

Aldo Compare, London, England, assignor to Garrard Engineering & Manufacturing Co. Ltd., Swindon, England, a British company Application December 27, 1946, Serial No. 718,704
In Italy March 18, 1942

Section 1, Public Law 690, August 8, 1946
Patent expires March 18, 1962

3 Claims. (Cl. 274—10)

Figures 1, 2, 3:
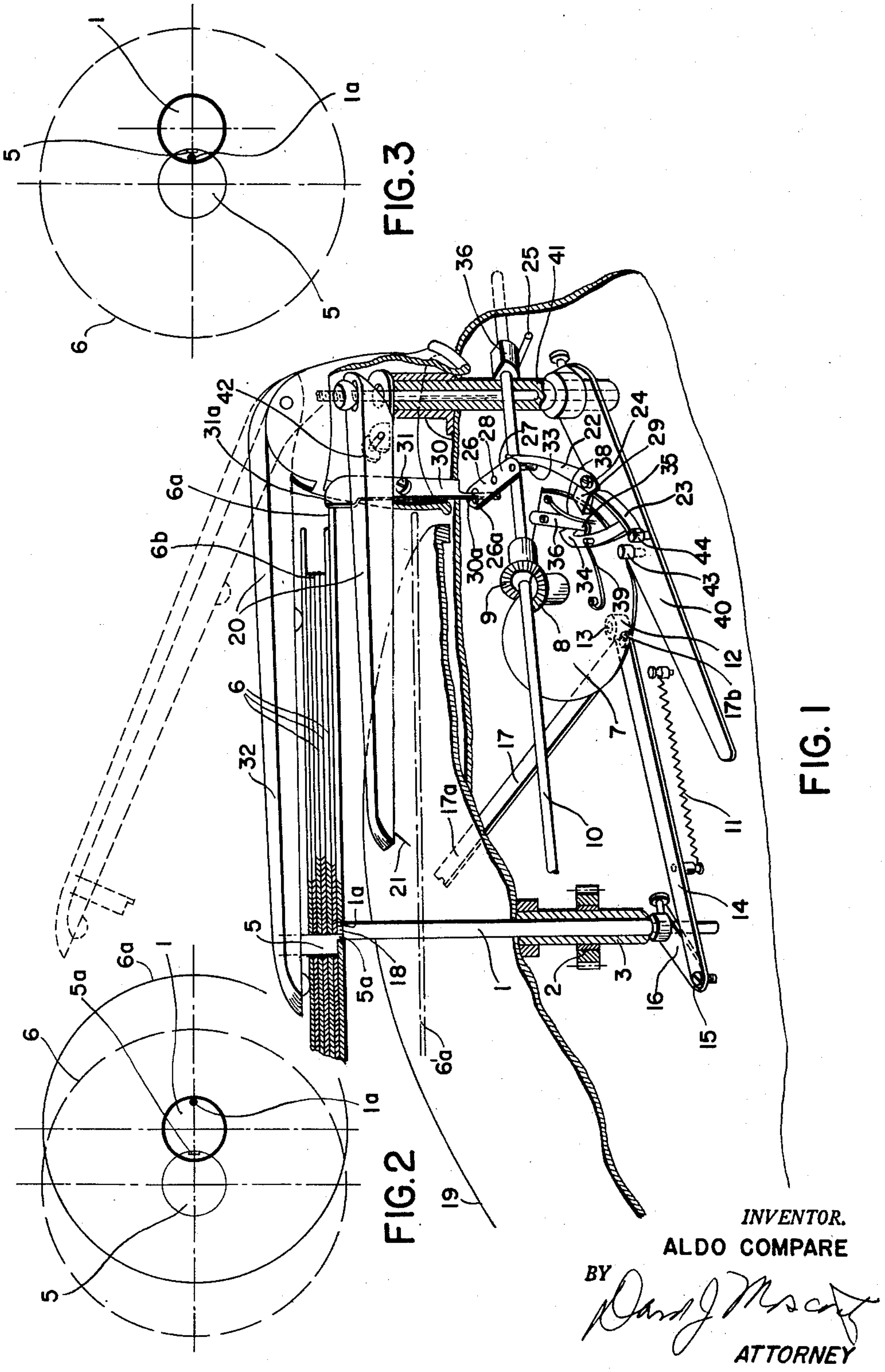

This invention relates to a device for automatically placing talking-machine records of different diameters on the turn-table in place of a record that has just been played.

The device is primarily characterised by the feature that the stack formed by the superposed records that are to be played in succession is held together as a whole by a rod or column, which is provided with an eccentric tooth, which is co-axial with the driving shaft. This column is not set in rotation by the shaft itself, but can be turned through an angle of 180 degrees by a cam which is separately driven by the gramophone motor.

When the rod is located in its starting position, the eccentric tooth is located, while the record is falling on to the disc or turn-table and is being set in rotation, in such a position that the under record of the stack remains supported upon the rod or column; whereas if this small tooth on the supporting rod, after the playing of the record that has just been used, assumes a diametrically opposite position, and the under record moves from the rod through its hole into a co-axial position in relation to the rod itself, it can accordingly slip down along the latter and assume its position of use. Meanwhile it meets an inclined plane or curve, which, at the end of a lever, serves to adjust the initial position of the tone-arm.

In this way the result is obtained, by a mechanism of the utmost simplicity, that the records slip down along the supporting rod in order, the initial position of the tone arm being automatically regulated to correspond to the diameter of the record, in so far as records of different diameters have to be exchanged.

The invention furthermore relates to the details and appliances that effect the raising and moving of the tone arm in agreement with and in sequence with the other movements mentioned.

The invention will be readily understood from the following detailed description of one form of construction given merely by way of example, which is illustrated in the accompanying drawings, in which:

Figure 1 is a view of the apparatus as a whole, which serves for automatically placing the record upon the turn-table or motor disc and for moving the tone arm; and Figures 2 and 3 are two outline plan views, which show diagrammatically the corresponding positions of the upper pivot and of the small lower shaft which effects the displacement and the convenient slipping down of the lowest record as soon as the latter is to be played.

With special reference to the figures of the drawing, 1 is a supporting rod, which serves as a pivot for a tubular shaft 3, which, by means of a pinion 2, is driven by an electric motor, not shown. 1a is a small tooth provided at the upper end of the rod 1; 5 is a pivot which is eccentric in relation to the rod 1, and which is provided at its lower end with a small tooth 5a. 6, 6 are the superposed records, which form a stack, and are kept concentric with one another by the pivot 5. The lowest of them is held by the projection on the rod 1, when the latter is located with its tooth in the corresponding position shown in Figure 2. A cam disc 7, which is rotated by a pair of gear wheels 8, 9 actuated by a small shaft 10, is so coupled to the hollow shaft 3 that the cam disc executes a single rotational movement and is then disconnected when the record to be played has dropped on to the turn-table, the sound box has been placed on the first groove of the record and the record begins to revolve for the purpose of being played. 11 is a return spring; 12 is a small roller which revolves on a pivot 13 on the cam disc 7; 14 is a connecting rod, which is pivoted at 15 to the end of an arm 16, which is keyed to the lower end of the vertical rod 1. 17 is a rod which is pivoted at its end 17a at a fixed point of the framework, not shown. These members 12, 14 and 17 are so mounted that while the rotation of the cam disc 7 is continuing, the roller 12, at a given time or at a definite position, strikes against the joint 17b connecting the members 14 and 17, whereby a swinging of the arm 16 through 180 degrees is effected, in such a way that the small tooth 1a of the shaft 3 turns through 180 degrees, a displacement of the lowest record 6 of the stack being effected, and this lowest record being so moved that the central hole 18 therein registers co-axially in relation to the supporting rod 1, whereby the record slips down along the latter, and finally is deposited upon the turntable 19.

A description will now be given of the device that brings the abovementioned movements of the record that is about to be played into harmony with the requisite movements of the tone-arm 20, which carries the sound box, with the needle 21.

A double-armed lever 22, 23, is rockably mounted on the end of an arm 29 by a pivot 24, which is secured to the cam disc 7. 26 and 27 are the two arms of a lever pivotally mounted at 28 on the lower part of a supporting plate 29. 30 is a further lever, which is pivotally mounted at 31 on a strut which carries an upper arm 32. The upper end 31a of the lever arm 30 forms an impact edge for records of the larger diameter. Now if one of the records 6, for instance the record 6a, is supported upon the rod 1, and the latter is rotated in such a way that its small tooth 1a is located in the position shown in Figures 1 and 2, the arm 31a is displaced to the right. The arm 30 will then move to the left, and by means of a finger 30a thereon introduced into a hole 26a in the lever arm 26 will displace the lever arm 27 to the right, and a little pin 33 on the arm 27 will cause the lever arm 22 to swing to the right, and will consequently cause the lever arm 23 to swing to the left, that is to say, towards the centre of the cam 7, which, by means of a hook 34, engages in a hook 35 of an arm 36, and by the aid of springs 38 and 39 is pushed progressively in the direction of release. This hooking engagement is effected by the slipping down of the record 6a. In this way therefore the tone arm 20 is displaced for the purpose of beginning the reproduction, which is effected by means of the following members and of the following movements: An arm 40, which is keyed to a shaft 41, which carries the tone arm 20 pivotally mounted thereon effects, by means of a displacement of the arm 40 brought about by the cam 7, a rotation of the shaft 41, and sets the needle of the sound-box vertically upon the outermost groove of the record 6a to be played. 43 and 44 are two pins carried by the arm 40, which is positively connected with the tone arm 20, the arm 23 being capable of being inserted between them. In this case the swinging of the lever itself, brought about by the pin 43, occasions a slight oscillation of the arm 40, whereby in this case the needle is similarly deposited vertically upon the outermost groove of a small record 6b. It is clear that all the parts of the machine can be suitably regulated to meet the requirements. At every revolution of the cam 7 the two hooks 34 and 36 engage in one another, but not before the next record has slipped down.

I will now describe the devices and the series of movements that effect the lowering of the tone arm. The devices include a finger 25, which projects out of the part of a small block or cam 36 that is carried by the end of the rotatable shaft 10.

The finger 25 is an L-shaped finger which slides in the interior of the hollow shaft 41 in such a way that the rotation of the shaft 10 effects a displacement of the cam 36, which raises and lowers the tone-arm 20 by means of a bracket or cantilever 42.

I claim:

1. A record changing mechanism for an automatic phonograph having a turntable for receiving, in playing position, a record from a stack of records, including a downwardly extending centering pin for threading at their centers a group of records forming a stack, an upwardly extending spindle offset from said pin for disposing the record discharged from the stack when axially aligned therewith in playing position on the turntable, said spindle having a flat upper surface for supporting, at a zone adjacent their centers, the stack of records threaded on said centering pin, and an upstanding projection leading from said flat surface and of height equal to the thickness of a record, said projection being eccentrically disposed with respect to the axis of said spindle, and means for periodically angularly displacing said spindle up to 180° whereby to dispose the lowermost record of the stack, with its center in alignment therewith, for movement by gravity therealong onto the turntable.

2. A record changing mechanism for an automatic phonograph having a turntable for receiving a record in playing position, including a downwardly extending centering pin for threading at the central apertures thereof a group of records defining a stack, an upwardly extending spindle offset from said pin, the upper most surface of which supports records of the stack in a zone adjacent the center hole thereof, an upwardly extending projection of small cross-section disposed eccentrically of the axis of said spindle, a downwardly extending tooth mounted eccentrically of said centering pin, said spindle serving to support all of the records in the stack centered by said pin when the respective teeth of the rod and pin are in adjacency and means for periodically angularly displacing said spindle and the tooth thereon whereby said tooth laterally displaces the lowermost record of said stack from alignment with the remainder of the records in the stack to a position where its center hole is in alignment with the spindle, thereby to drop along said rod by gravity to said turntable, the height of the respective teeth on said rod and centering pin being equal to the thickness of a record.

3. Means for automatically changing the records of talking machines as claimed in claim 2, characterised by the feature that the spindle, which carries the small eccentric tooth, is coaxially mounted in relation to the hollow shaft of an electric motor driving the talking machine, and carries an arm which is operated by a cam disc and which enables it to be rotated through 180 degrees relatively to the starting position as soon as one record that has been slipped on to the turn-table has been played through.

ALDO COMPARE.

REFERENCES CITED

The following references are of record in the file of this patent:

UNITED STATES PATENTS

| Number | Name | Date |
|---|---|---|
| 1,970,691 | Collison et al. | Aug. 21, 1934 |
| 2,235,693 | Wells | Mar. 18, 1941 |
| 2,237,340 | Downs | Apr. 8, 1941 |